United States Patent [19]

Schaeffer

[11] Patent Number: 5,281,878
[45] Date of Patent: Jan. 25, 1994

[54] ADAPTOR FOR HYDRAULIC POWER TILT/TRIM RESERVOIRS

[76] Inventor: George L. Schaeffer, HC 65, Box 5640, Florien, La. 71429

[21] Appl. No.: 937,526

[22] Filed: Aug. 27, 1992

[51] Int. Cl.$^5$ .......................... H02K 5/00; F04B 17/00
[52] U.S. Cl. .......................................... 310/91; 310/87; 415/170.1; 417/423.6
[58] Field of Search ...................... 310/91, 87, 89, 90, 310/112; 415/170.1, 175; 417/423.1, 423.3, 423.6

[56] References Cited

U.S. PATENT DOCUMENTS

| D. 243,655 | 3/1977 | Matousek | D8/8 |
|---|---|---|---|
| 2,513,735 | 7/1950 | Nardone | 248/2 |
| 3,432,705 | 3/1969 | Lindtveit | 310/91 |
| 3,580,367 | 5/1971 | McCarthy | 188/206 |
| 3,841,791 | 10/1974 | Doolin | 415/175 |
| 4,212,446 | 7/1980 | Domanick et al. | 248/678 |
| 4,501,530 | 2/1985 | Rockwood et al. | 415/170.1 |
| 4,577,828 | 3/1986 | Drucker et al. | 248/678 |
| 4,800,309 | 1/1989 | Lakin | 310/90 |
| 5,076,762 | 12/1991 | Lykes et al. | 417/40 |
| 5,176,391 | 1/1993 | Schneider et al. | 280/6.1 |

*Primary Examiner*—Steven L. Stephan
*Assistant Examiner*—Matthew Nguyen
*Attorney, Agent, or Firm*—John M. Harrison

[57] ABSTRACT

Adaptors for hydraulic reservoirs in OMC (Outboard Marine Corporation) and Mercury outboard motor power trim and power tilt systems. The adaptors include aluminum adaptor blocks having one face adapted to fit an OMC or Mercury outboard motor hydraulic fluid reservoir and motor in a power trim/tilt system and the other face configured to receive an electric motor. In one embodiment a spacer ring is used to space the adaptor from the hydraulic fluid reservoir and a connecting shaft extends through the adaptor to connect the hydraulic reservoir pump and the electric motor.

14 Claims, 2 Drawing Sheets

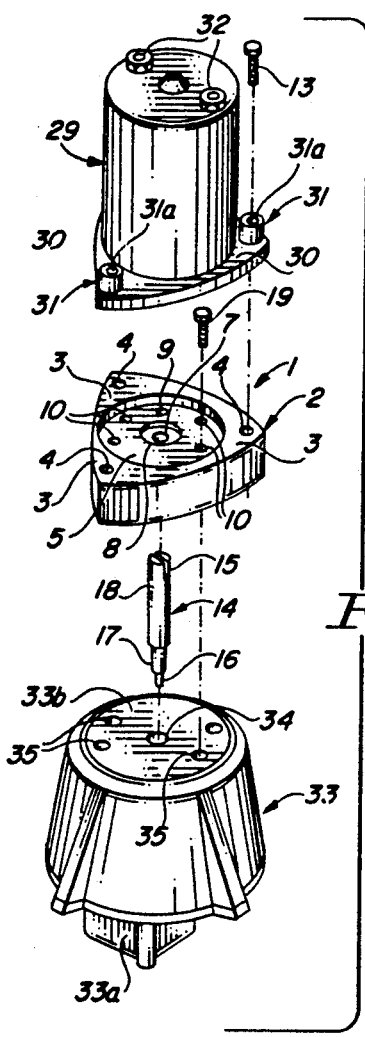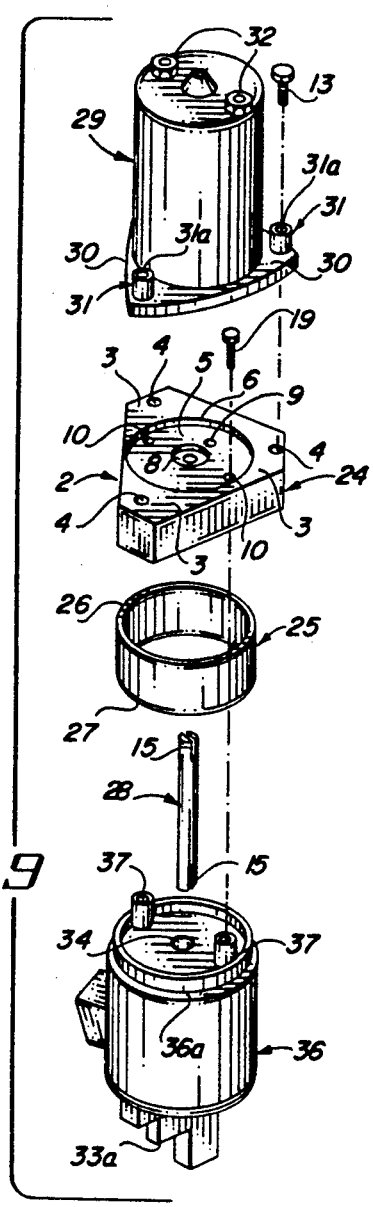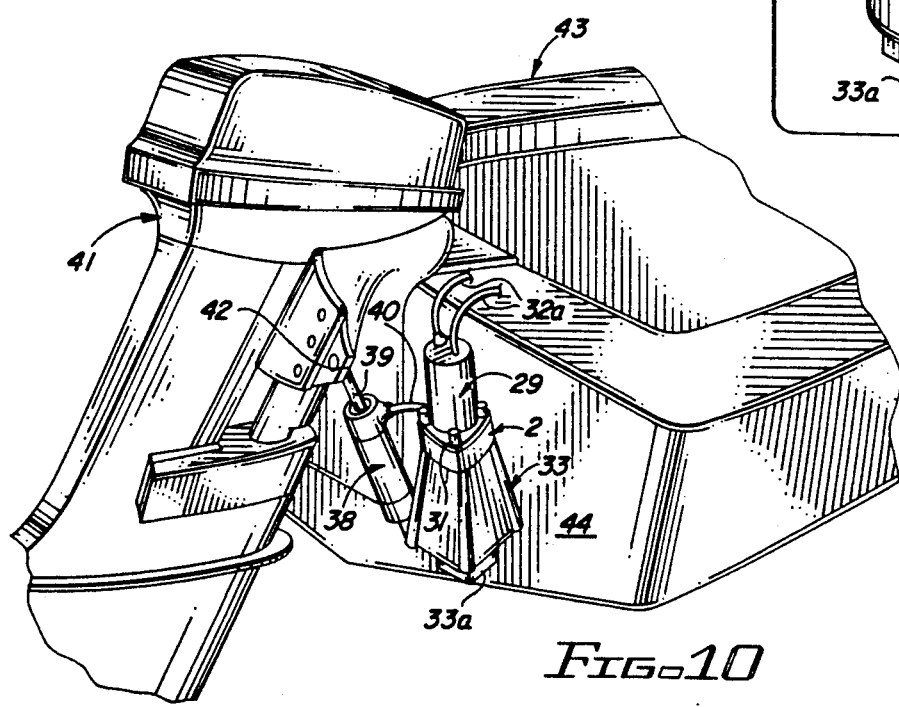

ADAPTOR FOR HYDRAULIC POWER TILT/TRIM RESERVOIRS

BACKGROUND OF THE INVENTION

Field of the Invention

This invention relates to power trim and power tilt systems for outboard motors and more particularly, to adaptors for use in mounting a new and improved electric motor to hydraulic fluid reservoirs in Mercury and OMC (Outboard Marine Corporation) outboard motor power trim and power tilt systems. The adaptors of this invention are characterized by an adaptor face designed to receive and mount the hydraulic fluid reservoir in an OMC or Mercury power tilt or power trim system, with the opposite face of the adaptor configured to receive and mount an improved electric motor for driving the pump in the hydraulic fluid reservoir and operating the power trim or power tilt system to raise and lower an outboard motor mounted on the transom of a boat. The adaptors of this invention are designed to replace the conventional electric motors supplied by the factories in power trim and power tilt systems of Mercury and OMC outboard motors in favor of an improved, lower cost, higher efficiency electric motor for operating the respective hydraulic fluid pumps located in the corresponding hydraulic fluid reservoirs of the power trim and power tilt systems built by these companies. The adaptors may be quickly and easily installed on conventional hydraulic fluid reservoirs and include a specially designed connecting shaft for engaging the newly installed electric motor and the conventional hydraulic fluid pump located at the base of the hydraulic fluid reservoir in the respective power tilt and power trim systems of Mercury and OMC outboard motors. Furthermore, the newly installed electric motor is typically wired to a double pole, double throw switch for operating the power tilt or power trim system and raising and lowering the outboard motor with respect to the boat transom. The conventional hydraulic fluid pumps and reservoirs utilized in Mercury and OMC power tilt and power trim systems are designated by the trademarks "Calco" and "Prestolite" and the adaptors of this invention are designed to accommodate these hydraulic fluid reservoirs and pumps and match the new Electrosystems tilt/trim electric motor manufactured by United Technology to the "Calco" or "Prestolite" hydraulic fluid pumps and reservoirs, respectively.

Adaptors of various description and design have long been used to mate mismatched mechanical components for various purposes. U.S. Design Pat. No. 243,655, dated Mar. 15, 1977, to Stephen Matousek, et al, details an ornamental design for an "Adaptor Plate". U.S. Pat. No. 2,513,735, dated Jul. 4, 1950, to R. M. Nardone, details an "Engine Accessory" which is used as an adaptor plate or mount to join engine components. An "Adaptor for Mounting Replacement Electric Motors" is detailed in U.S. Pat. No. 3,432,705", dated Mar. 11, 1969, to H. Lindtveit. The adaptor plate is suitable for connecting an electric motor to an oil burner blower housing such that the motor shaft is correctly centered within the pilot hole of the blower wheel housing despite mismatched mounting parts of the motor and/or the blower housing. The adaptor plate includes at least three spaced groups of apertures in the adaptor plate, each group having apertures at different radii with respect to a given center on the adaptor plate, such that at least three projecting members may be mounted in the respective groups of apertures at a suitable radius to engage the lip of the blower wheel housing pilot hole and align the electric motor with the oil burner blower housing. U.S. Pat. No. 3,580,367, dated May 25, 1971, details a "Universal Mounting Plate and Construction Method". The mounting plate includes a caliper brake end plate which serves to mount the brake from a motor shell or the like. To hold the plate securely on motors having mounting bolts which are mounted on bolt circles of different radii, the plate is correspondingly arcuate about predetermined centers offset from the plate axis according to a formula. U.S. Pat. No. 4,212,446, dated Jul. 15, 1980, to Edward J. Domanick, et al, details a "Universal Mounting Pad for Electrical Transformers". The universal mounting pad includes an adjustable mechanism having multiple recesses with channel irons which engage movable bolts, to which a variety of different sized transformers can be attached. A support base for a polygon-shaped cabinet of an indoor fan coil unit, which base is molded of high density, non-metallic material and holds the cabinet during assembly, shipment and installation of the unit is detailed in U.S. Pat. No. 4,577,828 dated Mar. 25, 1986, entitled "Fan Coil Base Pod Assembly".

It is an object of this invention to provide an adaptor for joining an electric motor to a hydraulic fluid reservoir and pump component of a power tilt or power trim system for raising and lowering an outboard motor.

Another object of the invention is to provide a new and improved adaptor having one face shaped to receive the drive end of an electric motor and the opposite face configured to receive the top end of a hydraulic fluid reservoir containing a hydraulic fluid pump in an OMC or Mercury outboard motor power tilt/trim system.

A still further object of this invention is to provide an adaptor block for joining an Electrosystems tilt/trim electric motor to the hydraulic fluid reservoir-pump assembly of an OMC outboard motor power tilt/trim system, which adaptor includes a first face adapted to receive the drive end of the electric motor and the opposite face of the adaptor configured to engage the top face of the hydraulic fluid reservoir, with a specially designed connecting shaft engaging the electric motor armature shaft and the hydraulic fluid pump drive shaft in driving relationship to raise and lower an OMC outboard motor with respect to the motor transom.

Still another object of this invention is to provide an adaptor block, one face of which is configured to receive an Electrosystems tilt-trim electric motor and the other adapted to seat on the top of a hydraulic fluid reservoir containing a hydraulic fluid motor in a Mercury outboard motor power tilt/trim system for raising and lowering a mercury outboard motor and further including a connecting shaft extending through the center of the adaptor and engaging the electric motor armature shaft on one end and the hydraulic fluid pump drive shaft on the other end for operating the hydraulic fluid pump and raising and lowering the mercury outboard motor with respect to the transom of a boat upon which the motor is mounted.

A still further object of this invention is to provide a new and improved adaptor plate and spacer ring which are useful in joining an Electrosystems tilt/trim electric motor to a "Calco" hydraulic fluid reservoir containing a hydraulic fluid pump, wherein one face of the adaptor plate is designed to receive and mount the electric motor and the other face shaped to receive and mount the spacer ring, which spacer ring is, in turn, mounted on the top face of the hydraulic fluid reservoir and further including a specially designed connecting shaft having slots in the ends thereof, one of which slots engages the armature shaft of the electric motor and the other slot engages the shaft of the hydraulic fluid pump seated in the hydraulic fluid reservoir for raising and lowering an outboard motor with respect to the transom of a boat.

SUMMARY OF THE INVENTION

These and other objects of the invention are provided in new and improved adaptors designed to mate a highly efficient, compact Electrosystems tilt/trim electric motor to the hydraulic fluid reservoirs and hydraulic fluid pumps of OMC and Mercury outboard motor power tilt/trim systems. The adaptors are characterized by aluminum blocks, one recessed face of which is designed to receive and mount the drive end of the electric motor and the opposite recessed face of which is configured to receive and mount the top end of the respective reservoir. The specially designed connecting shafts are configured to couple the armature shaft of the electric motor to the drive shaft of the hydraulic fluid pump located in the hydraulic fluid reservoir to operate the power tilt/trim system and raise and lower the outboard motor on the transom of the boat.

BRIEF DESCRIPTION OF THE DRAWINGS

The invention will be better understood by reference to the accompanying drawings, wherein:

FIG. 8 is an exploded view of the OMC adaptor illustrated in FIGS. 1 and 2 in functional position to couple an electric motor to a hydraulic fluid reservoir and hydraulic fluid pump located in the hydraulic fluid reservoir;

FIG. 9 is an exploded view of an OMC adaptor in functional position to couple an electric motor to a "Calco" hydraulic fluid reservoir and hydraulic fluid motor, using a spacer ring; and FIG. 10 is a perspective view of the OMC adaptor illustrated in FIGS. 1, 2 and 8 in functional configuration mounted on the transom of a boat in a power trim/tilt system for raising and lowering an outboard motor with respect to the boat transom.

DESCRIPTION OF THE PREFERRED EMBODIMENTS

Figure 1:
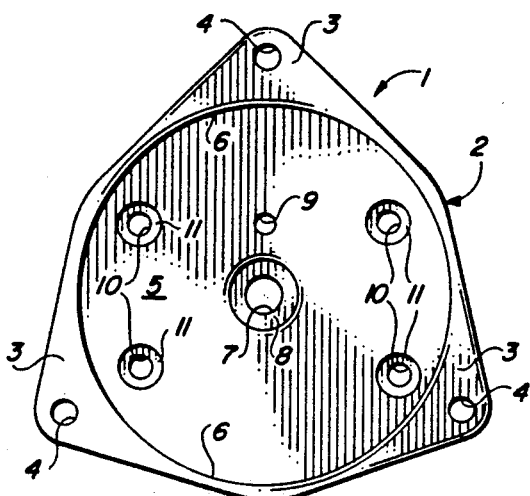
FIG. 1 is a plan view of the motor mount face of an OMC adaptor for securing an electric motor to the hydraulic fluid reservoir and pump of an OMC outboard motor power tilt/power trim system.
Figure 2:
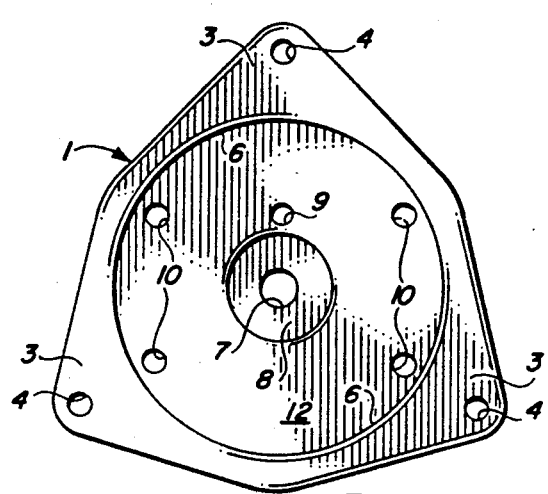
FIG. 2 is a plan view of the opposite reservoir mount face of the OMC adaptor illustrated in FIG. 1.

Referring initially to FIGS. 1-3, 8 and 10 of the drawings, in a first preferred embodiment of the invention an OMC adaptor is generally illustrated by reference numeral 1 and is characterized in a most preferred embodiment by an aluminum OMC adaptor block 2, shaped to define three OMC adaptor flanges 3 in spaced relationship around the periphery of the OMC adaptor block 2. FIG. 1 illustrates the OMC adaptor block 2 with a flat motor mount face 5 facing upwardly and recessed in a circular face boss 6 and internally-threaded motor mount bolt openings 4 provided in the OMC adaptor flanges 3, respectively, for receiving motor mount bolts 13, illustrated in FIG. 8. FIG. 2 illustrates the opposite side of the OMC adaptor block 2, which features a flat, recessed reservoir mount face 12, bordered by a face boss 6. A drive shaft opening 7 extends transversely through the center of the OMC adaptor block 2, through the motor mount face 5 and reservoir mount face 12 and includes a drive shaft opening recess 8, which surrounds the drive shaft opening 7 to act as an oil pool for lubrication purposes, as hereinafter further described. An oil reservoir 9 also extends through the motor mount face 5 transversely through the thickness of the OMC adaptor block 2 and the reservoir mount face 12, also for lubrication purposes. Four reservoir mount bolt openings 10 are spaced in the motor mount face 5 and include a countersink 11, for receiving four corresponding reservoir mount bolts 19, also illustrated in FIG. 8, for purposes hereinafter further described.

Figure 3:
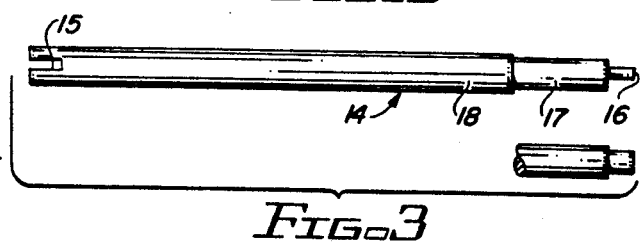
FIG. 3 is a plan view of a slot and blade connecting shaft for coupling the electric motor and hydraulic reservoir pump when the OMC adaptor illustrated in FIGS. 1 and 2 is in place.
Figure 6:
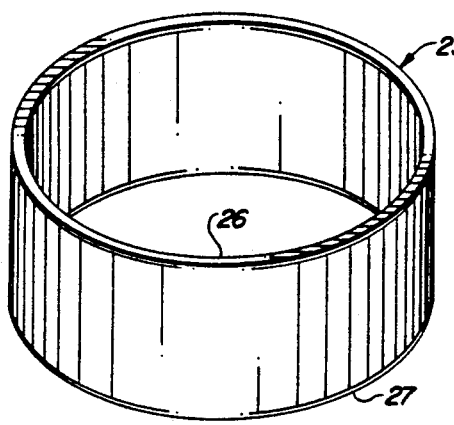
FIG. 6 is a perspective view of a spacer ring used to mount the OMC adaptor illustrated in FIGS. 1 and 2 to a "Calco" hydraulic fluid reservoir and pump.
Figure 7:
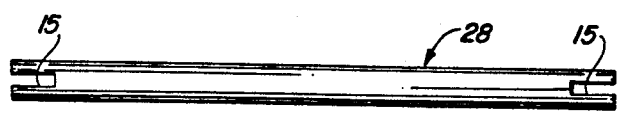
FIG. 7 is a plan view of a OMC "Calco" connecting shaft used to couple the electric motor armature shaft to the reservoir pump drive shaft in the "Calco" hydraulic fluid reservoir.

A slot and blade drive shaft 14 is illustrated in FIGS. 3 and 8 and includes an elongated shaft body 18, having a shaft tip 17 of reduced diameter at one end and also fitted with a drive shaft blade 16 extending from the shaft tip 17 and a drive shaft slot 15 provided in the opposite end of the shaft body 18 from the shaft tip 17. As illustrated in FIG. 8, the slot and blade drive shaft 14 is oriented with the drive shaft slot 15 projecting upwardly and the drive shaft blade 16 projecting downwardly, for purposes which will also be hereinafter further described.

As further illustrated in FIG. 8 the OMC adaptor 1 is designed to secure an electric motor 29 to a hydraulic fluid reservoir 33, which partially encloses a reservoir pump 33a, in the manner illustrated. Accordingly, the electric motor 29 is situated such that the motor flanges 30 aligned with the corresponding underlying OMC adaptor flanges 3 in the OMC adaptor block 2. The flange bosses 31 are upward-standing from the respective motor flanges 30 and are fitted with internally-threaded boss openings 31a for receiving the motor mount bolts 13 and projecting the motor mount bolts 13 through the boss opening 31a and threadably into the corresponding threaded and aligned motor mount bolt openings 4 in the OMC adaptor flanges 3, respectively. Furthermore, the slot and blade drive shaft 14 projects through the corresponding connecting shaft opening 7 in the OMC adaptor block 2, with the drive shaft slot 15 facing upwardly and the drive shaft blade 16 projecting downwardly, as heretofore described. Accordingly, the OMC adaptor block 2 seats on the top of the hydraulic fluid reservoir 33, with the reservoir mount face 12 seated on the flat reservoir face 33b and the shaft tip 17 and drive shaft blade 16 projecting through the corresponding reservoir shaft opening 34 extending vertically though the reservoir face 33b and engaging the drive shaft (not illustrated) of the reservoir pump 33a, mounted on the bottom of the hydraulic fluid reservoir 33, as illustrated. The reservoir mount bolts 19 are then inserted through the reservoir mount bolt openings 10 in the OMC adaptor block 2 and are threaded into corresponding reservoir mount openings 35, located in the flat reservoir face 33b of the hydraulic fluid reservoir 33, to secure the OMC adaptor 1 to the hydraulic fluid reservoir 33. The corresponding motor mount bolts 13, which are inserted through the respective boss openings 31a in the flange bosses 31, are then threaded into the corresponding internally threaded motor mount bolt openings 4 in the OMC adaptor flanges 3 in the OMC adaptor block 2 to removably secure the electric motor 29 on the OMC adaptor 1. The entire electric motor 29 - GMC adaptor 1 - hydraulic fluid reservoir 33 assembly is then mounted on the boat transom 44 of a boat 43 in conventional fashion as illustrated in FIG. 10, with the terminals 32 of the electric motor 29 receiving corresponding wiring 32a, to energize the electric motor 29 by operation of a suitable switch, not illustrated. Hydraulic fluid lines 40 connect the reservoir pump 33a and hydraulic fluid reservoir 33 to a hydraulic cylinder 38 having a cylinder piston 39. The cylinder piston 39 is mounted to the piston mount bracket 42 of an outboard motor 41, while the hydraulic cylinder 38 is mounted on the boat transom 44 of the boat 43. Accordingly, energizing the electric motor 29 by manipulation of a suitable switch (not illustrated), which is most preferably a double-pole, double-throw switch, facilitates selective extension and retraction of the cylinder piston 39 in the hydraulic cylinder 38 by operation of the reservoir pump 33a. Operation of the cylinder piston 39 in this manner raises and lowers the outboard motor 41 with respect to the transom 44 of the boat 43, as further illustrated in FIG. 10.

Figure 4:
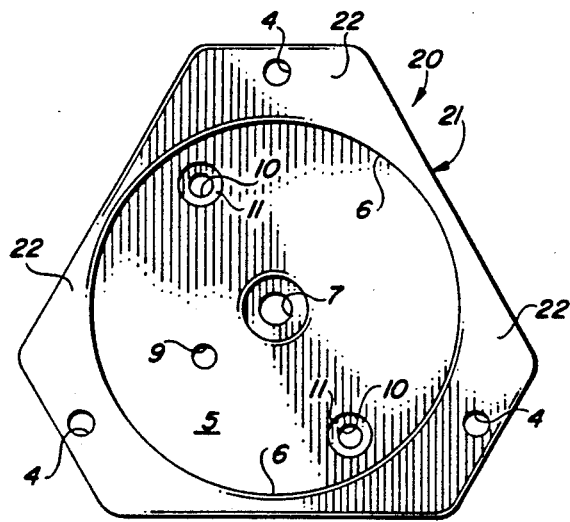
FIG. 4 is a plan view of the motor mount face of a Mercury outboard motor power tilt/trim system adaptor.
Figure 5:
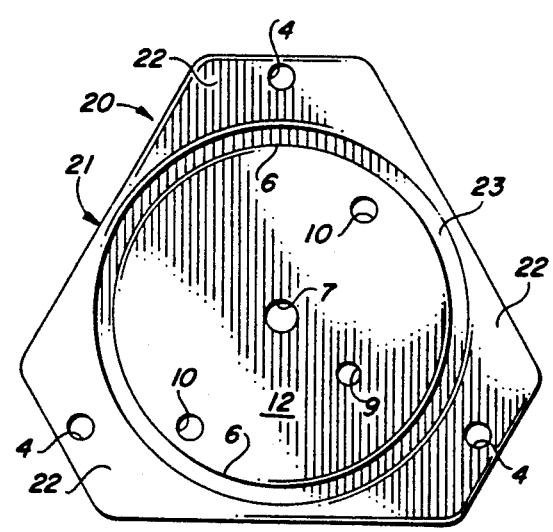
FIG. 5 is a plan view of the reservoir mount face of the Mercury power tilt/trim system adaptor illustrated in FIG. 4.

Referring now to FIGS. 4 and 5 of the drawings, a similar adaptor mounting apparatus is provided using the mercury adaptor 20, which includes a mercury adaptor block 21, fitted with spaced mercury adaptor flanges 22, having internally-threaded motor mount bolt openings 4. The electric motor 29 is mounted on the motor mount face 5 of the mercury adaptor 20, which is configured exactly as the motor mount face 5 of the OMC adaptor 1 illustrated in FIG. 1. The opposite side of the mercury adaptor 20 is characterized by a recessed, flat reservoir mount face 12 and a raised seat 23, bordered by a face boss 6, which are designed to accommodate a hydraulic fluid reservoir 33 of corresponding dimensions and configuration in the Mercury outboard motor power tilt and trim systems. Furthermore, the mercury adaptor 20 is sandwiched between the electric motor 29 and the corresponding hydraulic fluid reservoir 33 which conforms to the Mercury outboard motor power tilt, power trim system in the same manner as that illustrated in FIG. 8 with respect to the OMC adaptor 1. Moreover, the slot and blade drive shaft 14 illustrated in FIG. 3 may be utilized to couple the electric motor armature or drive shaft (not illustrated) to the corresponding drive shaft (not illustrated) in the reservoir pump 33a in the same manner as that illustrated in FIG. 8. The mercury adaptor 20 may thus be used in a Mercury outboard motor power tilt/trim system in the same manner as illustrated in FIG. 10 with respect to the OMC system to raise and lower a Mercury outboard motor 41 with respect to the transom 44 of a boat 43.

Referring now to FIG. 9 of the drawings, in another preferred embodiment of the invention, under circumstances where it is desired to couple an electric motor 29 to a slightly larger "Calco" reservoir 36 in an OMC outboard motor power tilt/trim system, a spacer ring 25 must be used to align the reservoir mount face 12 of the OMC adaptor 1 with the top faces of the corresponding elongated reservoir bosses 37 in the "Calco" reservoir 36. Accordingly, the specially designed, double-slotted OMC "Calco" drive shaft 28 is positioned to extend through the reservoir shaft opening 34 located in the "Calco" reservoir 36 and through the corresponding drive shaft opening 7 provided in the correspondingly sized OMC "Calco" adaptor 24 to facilitate engagement of the armature, or drive shaft (not illustrated) of the electric motor 29 with the drive shaft slot 15 positioned in the top end of the OMC "Calco" drive shaft 28. The bottom drive shaft slot 15 is designed to receive a corresponding drive shaft (not illustrated) in the reservoir pump 33a of the hydraulic fluid reservoir 33, to couple the electric motor 29 to the reservoir pump 33a in driving relationship. Accordingly, the spacer ring 25 is seated between the OMC "Calco" adaptor 24 and the "Calco" reservoir 36, with the top ring edge 26 engaging the OMC adaptor flanges 3 and the bottom ring edge 27 mounted on the reservoir shoulder 36a of the "Calco" reservoir 36, as further illustrated in FIG. 9. The electric motor 29-OMC "Calco" adaptor 24- "Calco" reservoir 36 combination as so assembled operates in the same manner as the OMC adaptor assembly illustrated in FIG. 10, to operate the illustrated power trim or power tilt system.

It will be appreciated by those skilled in the art that the adaptors of this invention are useful in adapting a highly efficient, rugged electric motor to existing hydraulic fluid reservoirs and reservoir pumps in both OMC and Mercury outboard motor power tilt/trim systems. While the preferred embodiments of the invention have been described above, it will be further appreciated and recognized that various modifications may be made in the invention and the appended claims are intended to cover all such modifications which may fall within the spirit and scope of the invention.

Having described my invention with the particularity set forth above, what is claimed is:

1. An adaptor for mounting an electric motor on a hydraulic power tilt/trim reservoir having a hydraulic fluid pump, comprising an adaptor block disposed between said electric motor and said hydraulic power tilt/trim reservoir; oil reservoir means provided in said adaptor block for supplying oil to said connector shaft means; a recessed reservoir mount face provided in said one side of said adaptor block for receiving the hydraulic power tilt/trim reservoir, a recessed motor mount face provided in said opposite side of said adaptor block for receiving the electric motor and three threaded mount bolt receptacles provided in said adaptor block in spaced relationship for receiving said motor mount bolts, respectively; and connecting shaft means mounted for rotation in said adaptor block, with one end of said connecting shaft means engaging the electric motor and the opposite end of said connecting shaft means engaging the hydraulic fluid pump, whereby operation of the electric motor causes said connecting shaft means to rotate and operate the hydraulic fluid pump.

2. The adaptor of claim 1 wherein said fastener means further comprises at least two reservoir mount bolts for bolting the hydraulic power tilt/trim reservoir to one side of said adaptor block and three motor mount bolts for bolting the electric motor to the opposite side of said adaptor block.

3. The adaptor of claim 1 further comprising three adaptor flanges provided on said adaptor block in spaced relationship and wherein said mount bolt receptacles are located in said adaptor flanges, respectively.

4. The adaptor of claim 1 wherein said oil reservoir means further comprises a first oil reservoir extending transversely through said adaptor block and communicating with said reservoir mount face and said motor mount face and a second oil reservoir recessed in said recessed motor mount face and surrounding said connecting shaft means.

5. The adaptor of claim 4 further comprising a spacer ring positioned between said reservoir mount face of said adaptor and the hydraulic power tilt/trim reservoir for spacing said reservoir mount face from the hydraulic power tilt/trim reservoir.

6. An adaptor for mounting an electric motor on a hydraulic pump tilt/trim reservoir having a hydraulic fluid pump, comprising an adaptor block disposed between the electric motor and the hydraulic power tilt/trim reservoir; at least one oil reservoir means provided in said adaptor block for lubricating said connecting shaft means in said adaptor block; a reservoir mount face provided on one side of said adaptor block for receiving the hydraulic power tilt/trim reservoir; reservoir mount means connecting said reservoir mount face of said adaptor block to the hydraulic power tilt/trim reservoir; a motor mount face provided on the opposite side of said adaptor block for receiving the electric motor; motor mount means connecting said motor mount face of said adaptor block to the electric motor; and connecting shaft means transversely journalled for rotation in said adaptor block, with one end of said connector shaft means engaging the motor in driven relationship and the opposite end of said connecting shaft means engaging the hydraulic fluid pump in driving relationship, whereby operation of the electric motor rotates said connecting shaft means and operates the hydraulic fluid pump.

7. The adaptor of claim 6 wherein said reservoir mount means further comprises at least two reservoir mount bolt openings provided in said adaptor block in spaced relationship and at least two reservoir mount bolts projecting through said reservoir mount bolt openings and threadably engaging said hydraulic power tilt/trim reservoir for removably securing said reservoir mount face of said adaptor block to the hydraulic power tilt/trim reservoir.

8. The adaptor of claim 6 wherein said motor mount means further comprises three adaptor flanges provided on said adaptor block in spaced relationship, a threaded motor mount bolt opening provided in each of said adaptor flanges and three motor mount bolts engaging the electric motor and threadably projecting into said threaded motor mount bolt openings, respectively, for removably securing said motor mount face of said adaptor block to the electric motor.

9. The adaptor of claim 6 wherein:
(a) said reservoir mount means further comprises at least two reservoir mount bolt openings provided in said adaptor block in spaced relationship and at least two reservoir mount bolts projecting through said reservoir mount bolt openings and threadably engaging said hydraulic power tilt/trim reservoir for removably securing said reservoir mount face of said adaptor block to the hydraulic power tilt/trim reservoir; and
(b) said motor mount means further comprises three adaptor flanges provided on said adaptor block in spaced relationship, a threaded motor mount bolt opening provided in each of said adaptor flanges and three motor mount bolts engaging the electric motor and threaded into said threaded motor mount bolt openings, respectively, for removably securing said motor mount face of said adaptor block to the electric motor.

10. The adaptor of claim 6 wherein said at least one oil reservoir means further comprises a connecting shaft opening recess provided in said motor mount face of said adaptor block, said shaft opening recess lying adjacent to said connecting shaft and at least one oil reservoir spaced from said connecting shaft opening recess and communicating with said reservoir mount face and said motor mount face.

11. The adaptor of claim 6 further comprising a spacer ring positioned between said reservoir mount face of said adaptor block and the hydraulic power tilt/trim reservoir for spacing said reservoir mount face from the hydraulic power tilt/trim reservoir.

12. An adaptor for mounting an electric motor having a motor drive shaft on a hydraulic power tilt/trim reservoir having a hydraulic fluid pump fitted with a pump shaft, said adaptor comprising an adaptor block having three spaced flanges, said adaptor block disposed between the electric motor and the hydraulic power tilt/trim reservoir; a reservoir mount face recessed in one side of said adaptor block for receiving the hydraulic power tilt/trim reservoir; reservoir mount bolt openings provided in said adaptor block and extending through said reservoir mount face and at least two reservoir mount bolts projecting through said reservoir mount bolt openings and threadably engaging the hydraulic power tilt/trim reservoir for removably securing the hydraulic power tilt/trim reservoir to said reservoir mount face of said adaptor; a motor mount face recessed in the opposite side of said adaptor block for receiving the electric motor; a threaded motor mount bolt opening provided in each of said flanges and a motor mount bolt projecting from the electric motor and threadably engaging each of said threaded motor mount bolt openings, respectively, and removably securing the electric motor to said motor mount face of said adaptor; and a connecting shaft having one end engaging the pump shaft of the hydraulic fluid pump in driving relationship and the opposite end of said connecting shaft engaging the motor drive shaft in driven relationship; whereby operation of the electric motor rotates said connecting shaft and operates the hydraulic fluid pump.

13. The adaptor of claim 12 wherein said at least one oil reservoir further comprises a connecting shaft opening recess provided in said motor mount face of said adaptor block and lying adjacent to said connecting shaft and at least one oil reservoir spaced from said connecting shaft opening recess and communicating with said reservoir mount face and said motor mount face.

14. The adaptor of claim 12 further comprising a spacer ring positioned between said reservoir mount face of said adaptor block and the hydraulic power tilt/trim reservoir for spacing said reservoir mount face from the hydraulic power tilt/trim reservoir.

* * * * *